United States Patent [19]

Smith

[11] 3,906,324

[45] Sept. 16, 1975

[54] POSITIONAL SERVO SYSTEM HAVING THREE PHASE SPEED, NUMERICAL CONTROL

[75] Inventor: Ian W. Smith, Warwick, England

[73] Assignee: Alfred Herbert Limited, Edgwick, England

[22] Filed: May 3, 1973

[21] Appl. No.: 356,841

[30] Foreign Application Priority Data
May 6, 1972 United Kingdom............... 21274/72

[52] U.S. Cl. ................ 318/567; 318/571; 318/573; 318/603; 318/604; 318/638
[51] Int. Cl. ............................................ G05b 13/00
[58] Field of Search .......... 318/560, 565, 566, 569, 318/572, 573, 574, 600, 601, 602, 603, 561, 567, 568, 571, 638; 235/151.11

[56] References Cited
UNITED STATES PATENTS

| | | | |
|---|---|---|---|
| 3,218,532 | 11/1965 | Toscano............................ | 318/603 |
| 3,493,827 | 2/1970 | Tinkler ............................. | 318/603 X |
| 3,576,979 | 5/1971 | McCall et al. ................... | 318/565 X |
| 3,619,581 | 11/1971 | Kimura et al. ................... | 235/151.11 |
| 3,720,817 | 11/1970 | Dinwiddie ...................... | 235/151.11 |
| 3,733,484 | 5/1973 | Bayard............................. | 318/601 |
| 3,748,563 | 7/1973 | Pomella et al. .................. | 318/571 X |
| 3,752,969 | 8/1973 | Kiffmeyer et al. ............ | 318/602 UX |
| 3,769,488 | 10/1973 | Hasslinger.................. | 235/151.11 X |
| 3,777,245 | 12/1973 | May................................ | 318/603 X |

Primary Examiner—James R. Scott
Attorney, Agent, or Firm—Mason, Mason & Albright

[57] ABSTRACT

A machine tool control system is disclosed incorporating a digital computer responsive to a microprogram. Also disclosed is a closed loop servo control system for controlling a variable, in which the error between the demanded and actual values of the variable is monitored and compared with a reference limit to produce a warning signal when the monitored error exceeds the reference limit. The reference limit is varied automatically in dependence on the rate of change of the demanded value of the variable. Further disclosed is a servo control system in which a controlled variable is adjusted towards a demanded value at a speed which initially increases at a predetermined rate and is then held constant. The total required change in the controlled variable is initially stored and, in response to each incremental change in the controlled variable towards the demanded value, the stored value is decremented by a corresponding amount if the variable is changing at the constant speed and by twice the corresponding amount if the variable is changing at the increasing speed. When the stored value has been completely offset, the speed at which the controlled variable changes is reduced to zero at the same rate as the predetermined rate at which it was initially increased towards the constant speed.

7 Claims, 5 Drawing Figures

FIG. I

POSITIONAL SERVO SYSTEM HAVING THREE PHASE SPEED, NUMERICAL CONTROL

The invention relates to automatic control systems and more particularly, though not exclusively, to such control systems for controlling machine tool apparatus.

According to the invention, there is provided a machine tool control system incorporating a digital computer responsive to a microprogram.

According to the invention, there is further provided a method of controlling a machine tool using a digital computer responsive to a microprogram.

According to the invention, there is yet further provided a closed loop servo control system for controlling a variable, including means for monitoring the error between the demanded value and the actual value of the controlled variable, means for comparing the monitored error with a reference limit whereby to produce a warning signal when the monitored error exceeds the reference limit, and means for varying the reference limit in dependence on the rate of change of the demanded value of the controlled variable.

According to the invention, there is still further provided a method of controlling the value of a controlled variable, in which a demanded value of the controlled variable is compared with the actual value of the controlled variable to produce an error, and the controlled variable is adjusted in dependence on the error in a direction tending to reduce the said error to zero, and including the steps of comparing the said error with a reference limit whereby to produce a fault warning when the error exceeds the reference limit, and varying the value of the reference limit in dependence on the rate of change of the demanded value of the controlled variable.

According to the invention, there is also provided a servo control system including means responsive to a demanded value of a controlled variable to alter the controlled variable towards the demanded value at a speed which initially increases at a predetermined rate and is then held constant, means for storing the value of the total demanded change in the controlled variable, means responsive to each incremental change in the actual value of the controlled variable towards the demanded value to offset the stored value by a corresponding amount if the controlled variable is changing at the constant speed and by twice the corresponding amount if the controlled variable is changing at the increasing speed, and means operative when the stored value has been completely offset to cause the speed at which the controlled variable changes to reduce to zero at a rate equal to the said predetermined rate.

According to the invention, there is further provided a method of controlling the value of a controlled variable, in which, in response to a demanded value of the controlled variable, the controlled variable is caused to change towards the desired value at a speed which initially increases at a predetermined rate and is then held constant, and including the steps of summing the incremental changes in the controlled variable towards the demanded value, each such incremental change taking place while the speed of the controlled variable is increasing at the said rate being counted twice, and causing the speed of the controlled variable to reduce at a rate, equal in value to the said predetermined rate, when the sum of all the incremental changes in the controlled variable becomes equal to the total difference between the demanded and initial values of the controlled variable.

Automatic control systems and methods according to the invention will now be described, by way of example only, with reference to the accompanying diagrammatic drawings in which.

In accordance with a feature of the invention, an automatic control system for controlling machine tool apparatus uses a digital computer, the interface between the computer and the remainder of the servo system being by means of a microprogram. The use of a microprogram in this way enables the computer to carry out the necessary functions at a sufficiently high speed. This is because the computer is being actioned at a more basic level, allowing its programmed steps to be tailored more or less exactly to fit the particular application. Furthermore, the microprogram is stored in a form, such as a diode matrix, which can be accessed more quickly than a conventional computer program stored, for example, in ferrite cores.

In operation, the computer must calculate a demand signal and output it to the servo system at regular intervals. This outputting process must take into account the sign of the demand signal, check the error signal to see if it exceeds the maximum allowable, and signal to the computer any other causes of error. The time interval between outputs must be small to ensure that the frequency of output is higher than any resonant frequency in the servo loop. These functions place a heavy load on the computer program, when used in a machine tool application, particularly where several axes of movement are involved, and if a normal program is used to control these functions, the speed obtainable may be insufficient. The use of a microprogram enables these disadvantages to be overcome by virtue of the higher possible speed of operation. The computer may be within the servo loop or outside it.

The systems and methods to be described with reference to FIGS. 1 to 4 are not limited to machine tool applications (though may be particularly advantageous in such applications), but are applicable to servo systems for other applications as well.

Figure 1:
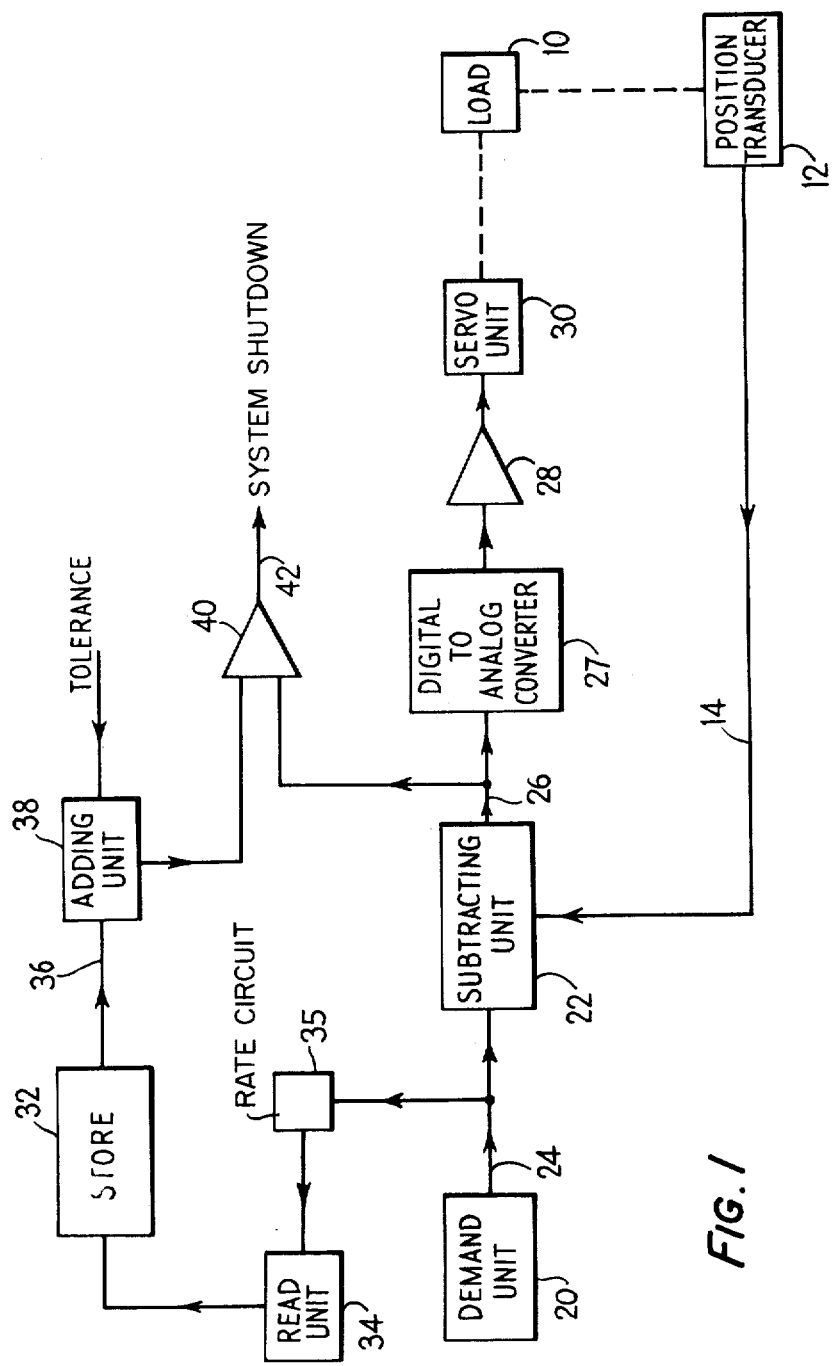
FIG. 1 is a block diagram of one of the systems.

FIG. 1 illustrates a position control servo system in block diagram form.

The system is for adjusting the position of a load 10 which may, for example, be a movable member such as the cutting tool of machine tool apparatus. The instantaneous position of the load is monitored by a position transducer 12 which produces a feedback signal (which may be in digital form) on a line 14 representing the position of the load.

Demand signals, that is, signals representing desired positions of the load 10, are produced by a demand unit 20 and fed to a subtracting unit 22 on a line 24. The demand unit 20 may be manually set up from time to time by an operator or it may be programmed to produce different demand signals at intervals, in accordance with a predetermined program. In the latter case, for example, the demand unit 20 may comprise an electronic digital computer suitably programmed to produce the desired demand signals and the demand signals may be in the form of digital signals. The programming may be by means of a microprogram.

In the subtracting unit 22, the demand signal, representing the desired position of the load, is algebraically added to the feedback signal on the line 14, representing the actual position of the load, and the subtraction unit 22 produces an error signal on a line 26 indicating the control action necessary to bring the load to the desired position. If the error signal is in digital form it is converted into analog form by a digital to analog converter 27. The error signal is then amplified in a servo amplifier 28 and applied to a servo unit 30 (such as an electro-hydraulic ram for example) which repositions the load 10 in the desired direction so as to tend to reduce the error signal to zero.

When the servo system is in motion and the demand signal is changing, the actual position of the load 10 will trail behind the demanded position by an amount known as the "following error." The greater the rate of change of the demand signal, the bigger will be this following error. If the servo system fails to follow the demand signal for any reason, then this will show up as an excessively large following error. The system of FIG. 1 therefore incorporates means to be described for monitoring the following error so as thereby to indicate a system failure when the following error becomes excessive.

As shown, therefore, the system of FIG. 1 includes a store 32 which stores a number of signals representing maximum permissible following error values, each of these signals corresponding with a particular rate of change of demand signal. The store is associated with a read unit 34. Unit 34 is activated by a unit 35 which monitors the demand signal on the line 24 and produces a signal dependent on the rate of change of the demand signal. The read unit 34 causes the store 32 to read out, on an output line 36, the appropriate maximum error signal according to the value of the signal received from the unit 35. This maximum error signal on the line 36 is then fed to an adding unit 38 where a further signal, representing a tolerance on the maximum permissible error, is added to it, and the final maximum permitted error signal is fed to one input of a comparator 40.

The second input of the comparator 40 is fed with the signal on the line 26, representing the actual error in the servo loop.

In operation, the comparator 40 compares the actual error in the servo loop with the maximum permissible error represented by the signal received from the adder 38. If the actual error should exceed the maximum permissible cover, then a fault signal is produced on a line 42 which may be used to give a warning and/or halt the servo system.

In this way, the system is able to compare the actual error in the servo loop with a maximum permissible following error limit which varies with the rate of change of the demand signal. The following error in the servo loop will increase with the rate of change of the demand signal. If, therefore, a single following error limit were used, this would have to be large enough to accommodate permissible following errors under high speed operations. Such an error limit would be excessively large for low speed operation, and therefore the checking process would be insufficiently sensitive at low speed to be useful. By varying the maximum permissible error limits with speed, this difficulty is overcome.

The error limits stored in the store 32 may be related to the demand speed according to a simple function (a linear function, for example), and in such a case the store 32 could be replaced by a suitable function generator responsive to the signal received from the unit 35. However, the relationship between the maximum permissible error limit and the demand speed may be more complex or empirical, in which case the store 32 would need to store a particular signal value for each demand speed increment.

In a case where the servo system incorporates or is controlled by a digital computer, the error checking function may be carried out within the computer under control of an appropriate program (which may be a microprogram).

Figure 2:
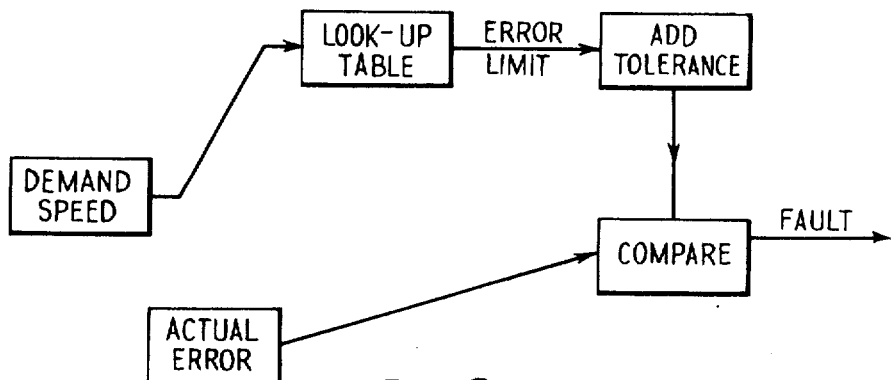
FIG. 2 is a block diagram illustrating steps in a method corresponding to the system of FIG. 1.

FIG. 2 shows diagrammatically the steps involved in such a program. As shown, the values of the maximum permissible error limits for each demand speed value are stored in the computer in the form of a "look-up table." A change in the demand speed causes the table to be accessed to read out the error limit. A tolerance is then added, and the resultant limit is compared with the actual error in the servo loop. If the actual error is found to be outside the limit, then the system enters a fault state.

FIG. 3 again illustrates a closed loop position control system in which the speed of the load movement is variable. In a manner to be explained, this system responds to a desired change in position by increasing the speed of load movement steadily from standstill until a predetermined speed is obtained (this period is referred to as the "velocity ramp-up"). The speed then remains constant, until, at a certain distance short of the final position, the speed is steadily reduced back to zero (this period is referred to as the "velocity ramp-down"). The system is arranged so that the rate of change of speed, whether acceleration or deceleration, is always the same. In a manner to be explained, the system ensures that the ramp-down always starts at the correct distance short of the final position so that the load comes to rest at the desired position.

Figure 3:
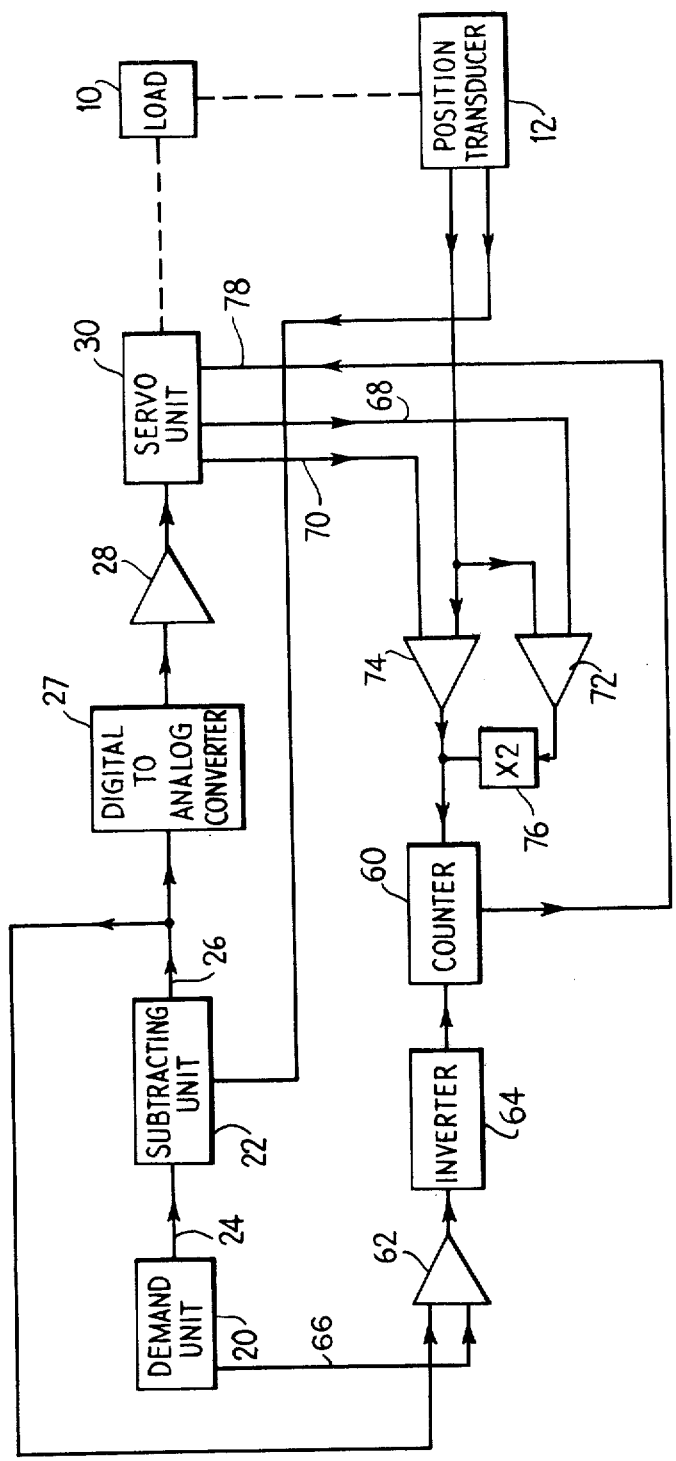
FIG. 3 is a block diagram of another of the systems.

Items in FIG. 3 corresponding to items in FIG. 1 are similarly referenced. In the system of FIG. 3, the servo unit 30 differs from that in the system of FIG. 1 in that it can be operated in three different modes — a ramp-up mode in which it accelerates at a constant rate, a constant speed mode, and a ramp-down mode at which it decelerates at a constant rate which is the same as the rate of acceleration during the ramp-up mode. Furthermore, the system of FIG. 3 incorporates a digital counter 60 which is connected to be set according to the initial value of the error signal which is assumed to be a digital signal in this case. As shown, the error signal is fed to the counter 60 through a gate 62 and an inverter 64. When a change in demanded position is made by the demand unit 20, the gate 62 is opened by means of a control signal on a line 66, and the digital value of the error signal at that time, which represents the total number of predetermined increments of load movement required to achieve the desired position, is stored as an appropriate negative number in the counter 60. The gate 62 thereafter remains closed until the next change in demand position.

The servo unit 30 has an output line 68 which is energised when the servo unit is operating in the ramp-up mode, and an output line 70 which is energised when the servo unit is operating in the constant speed mode. These lines control AND gates 72 and 74, respectively. In addition, these two gates are both connected to the position transducer 12 so as to receive signals each time the load undergoes one of the predetermined increments of movement. Therefore, one or other of the gates 72 and 74, according to which of the lines 68 and 70 is energised, produces a pulse output each time the load 10 moves through one increment. The output of the gate 74 is connected directly to the count-up input of the counter 60, while the output of the gate 72 is connected to this counter input through a pulse doubler 76 which converts each single pulse output of the gate 72 into a double pulse output.

The counter 60 has an output line 78 which is energised when the counter 60 has been counted up to zero. This line 70 is connected to the servo unit 30 and switches it into the ramp-down mode.

In operation, a new demand position from the demand unit 20 causes the subtraction unit 22 to produce a digital error signal on the line 26 representing the total number of movement increments required to position the load in the new desired position. The gate 62 is opened by the signal 66, and the counter 60 is counted down to a negative number representing this total number of increments. Gate 62 remains thereafter closed. The error signal on the line 26, after conversion to analogue form in the converter 27 and amplification, actuates the servo unit 30 which commences movement of the load 10 towards the desired position. The servo unit first enters the ramp-up mode and accelerates at the predetermined rate up to a constant speed. During this process, line 68 is held energised and line 70 is deenergised. The AND gate 72 is therefore open, and each increment of movement of the load 10 causes the gate 72 to produce a corresponding pulse output. This pulse is converted by the pulse doubler 76 into a double pulse, which therefore counts up the counter 60 by two. When the load has reached the predetermined constant speed, the servo unit 30 automatically enters the constant speed mode, and line 70 becomes energised and line 68 de-energised. Gate 72 is therefore closed and gate 74 opened, and each movement increment of the load therefore causes the counter 60 to count up by one.

When the counter 60 has been counted up to zero, line 78 becomes energised and switches the servo unit 30 into the ramp-down mode. The servo unit 30 therefore decelerates the load at the predetermined rate, and when it comes to rest, the load will be at the desired position. This follows from the fact that the ramp-up and ramp-down rates are the same and that the counter 60 is incremented twice for each movement increment during ramp-up, therefore effectively taking into account the length of movement required for ramp-down as well as for ramp-up; thus, with the counter being incremented once for each movement increment in the constant speed mode, it will reach zero count when the load has reached the correct position for initiation of the ramp-down mode.

As before, the demand signal 20 may be produced in the form of a binary or digital signal, in which case the position transducer 12 is arranged to produce a signal in similar form.

The system is particularly, though not exclusively, applicable to machine tool control. In such an application (as well as in other applications), the load may be required to move in two or three dimensions. In such a case, there would be separate servo motors and position transducers for each axis of movement, but only a single counter 60. This counter would be initially set with a negative number representing the sum of the moduli of the total number of the predetermined movement increments to be moved along each axis. Then, in operation, the counter would be counted up in response to each predetermined movement increment along each axis. As before, each increment of movement along an axis when the appropriate servo motor was moving in the ram-up mode would increase the count of the counter 60 by two. When the counter 60 has been counted back to zero, energisation of the line 78 would switch all the servo motors into the ramp-down mode.

The system described is advantageous as compared with systems which initially calculate the total number of movement increments required to achieve the position at which ramp-down should be initiated, and then, in response to each movement increment undergone, compare the total number of increments undergone up to that point with the total number required to achieve the beginning of the ramp-down. Such systems, where movement in several axes is taking place, require an addition step to be carried out after each movement increment. In cases where the system involves a digital computer, these calculations can put a very heavy load on the computer particularly in a machine tool application where the movement increments take place at a very high rate.

Figure 4:
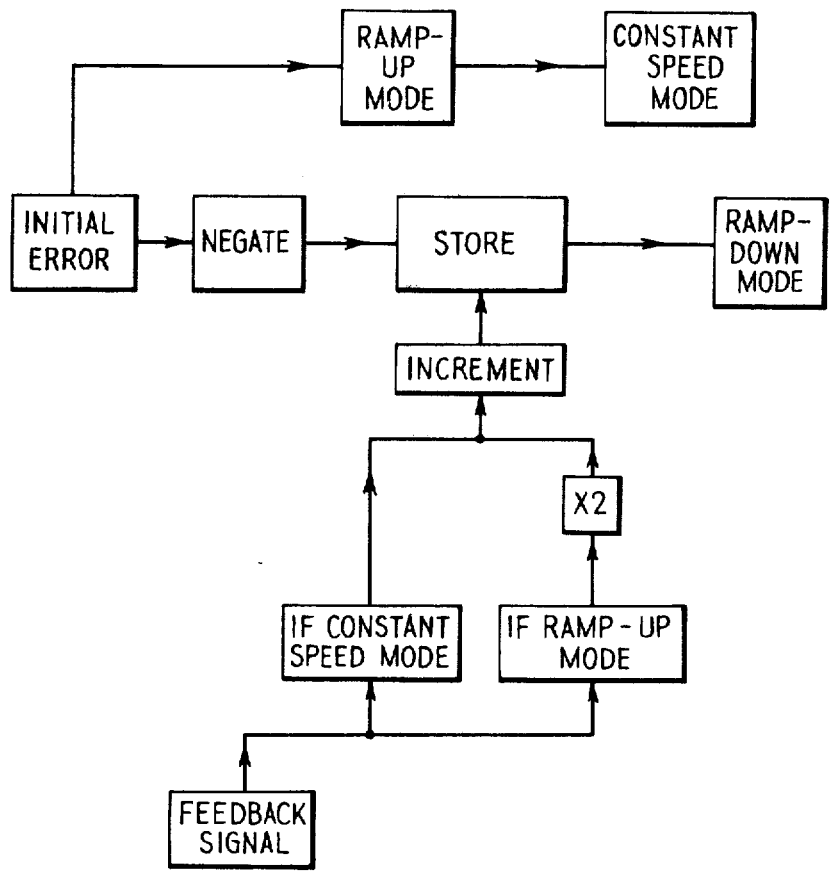
FIG. 4 is a block diagram illustrating steps in a method corresponding to the system of FIG. 3.
Figure 5:
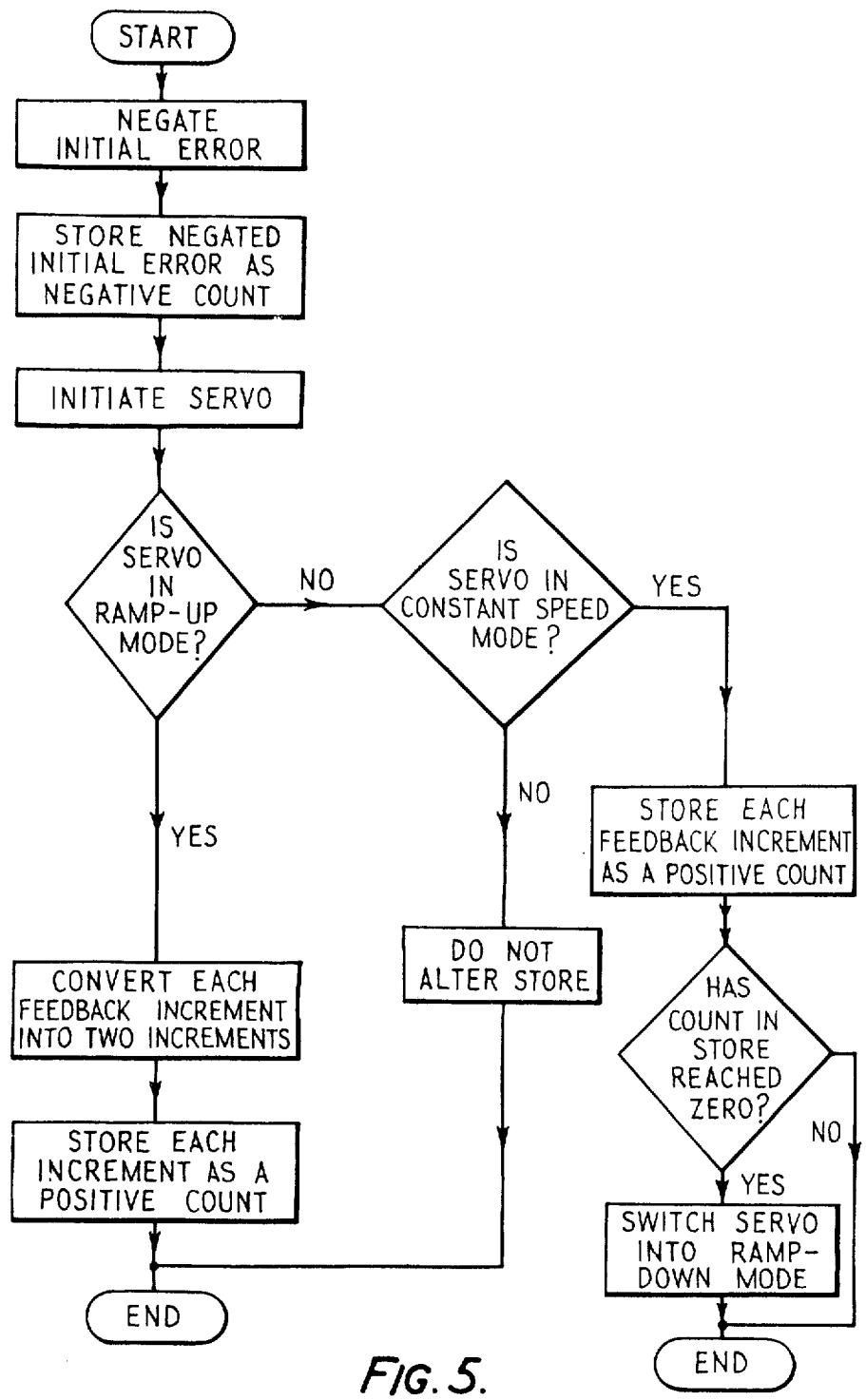
FIG. 5 is a program flow chart corresponding to FIG. 4.

As stated above, the system of FIG. 3 may be controlled by a digital computer which may produce the demand signal according to a predetermined program (a microprogram, for example). In such a case, the control of the ramp-up, constant speed and ramp-down modes may be achieved by the computer program, and FIG. 4 shows in block diagram form the sequence of steps involved. FIG. 5 shows these steps more specifically in the form of a flow chart.

As shown, in response to the initial error representing the total number of movement increments in axes required to achieve the demanded position, a negative number equal to the sum of the moduli of the total number of increments in each axis is stored in the computer store. The system is then caused to enter the ramp-up mode so as to accelerate the load at the predetermined rate until the predetermined constant speed is reached, at which time it enters the constant speed mode. Each load movement increment causes the stored negative number to be incremented. As shown, each such movement causes the stored number to be incremented by two when the system is in the ramp-up mode and by one when the system is in the constant speed mode. When the stored number has been incremented to zero, the program causes the system to enter the ramp-down mode.

The system described causes the final ramp-down to begin at the correct instant even if intermediate changes of speed have taken place between the initial ramp-up and the final ramp-down, provided that all such changes of speed take place at the predetermined rate. It will be appreciated that during any ramp-down period, no pulses are passed to the counter 60 (FIG. 3) or computer store.

What is claimed is:

1. In a closed loop machine tool control system incorporating a digital computer for producing a demand signal indicating a desired machine tool control setting, transducing means responsive to the machine tool to produce a feedback signal indicative of the actual machine tool setting, comparing means controlled by the digital computer for comparing the demand and feedback signals to produce an error signal dependent on the difference therebetween, and servo means connected to the machine tool and responsive to the error signal to adjust the machine tool setting in a direction tending to reduce the error signal to zero, the improvement wherein the digital computer functions under control of a micro-program.

2. In a method of controlling the value of a controlled variable in which, in response to a demanded value of the controlled variable, the controlled variable is caused to change towards the desired value at a speed which initially increases at a predetermined rate from an initial value and is then held constant, the improvement comprising the steps of:

summing the incremental changes in the controlled variable towards the demanded value, each such incremental change which takes place while the speed of the controlled variable is increasing at the said rate being counted twice, comparing the sum so formed with the total difference between the demanded and initial values of the controlled variable, and causing the speed of the controlled variable to reduce at a rate equal in value to the said predetermined rate, when the said sum becomes equal to the total difference between the demanded and initial values of the controlled variable.

3. A method according to claim 2, in which the controlled variable is position.

4. A method according to claim 2, in which the steps of summing the incremental changes in the controlled variable, and causing the speed of the controlled variable to reduce at the said rate, are performed by a digital computer working to a microprogram.

5. A servo control system, comprising servo means responsive to a demanded value of a controlled variable to alter the actual value of the controlled variable towards the demanded value at a speed which initially increases at a predetermined rate and is then held constant, storage means for storing the value of the total demanded change in the controlled variable, signal generating means responsive to each incremental change in the actual value of the controlled variable towards the demanded value to offset the stored value by a corresponding amount when the controlled variable is changing at the constant speed and by twice the corresponding amount when the controlled variable is changing at the increasing speed, and means operative when the stored value has been completely offset to cause the speed at which the controlled variable changes to reduce to zero at a rate equal to the said predetermined rate.

6. A system according to claim 5, where the controlled variable is the position of a controlled member and the controlled member has to move in two or more dimensions to reach the demanded value, and in which the said stored value is the sum of the movements required in each dimension, and in which the said signal generating means comprises means responsive to each incremental change in each of the said dimensions to offset the stored value by the said corresponding amount.

7. A system according to claim 5, in which the said storage means comprises a digital counter and means responsive to the initial error between the demanded and actual values of the controlled variable to set a number in the counter corresponding to the total number of incremental changes, each of predetermined size, between the demanded and actual values of the controlled variable, and in which the said signal generating means comprises a transducer arranged to monitor the actual value of the controlled variable and to produce a digital signal in response to each said incremental change thereof, means operative when the controlled variable is changing at the said constant rate to change the count of the counter towards zero by a count of one in response to each said digital signal, means operative when the controlled variable is changing at the increasing rate to change the count of the counter towards zero by a count of two in response to the said digital signal, and means operative when the count of the counter reaches zero to cause the rate of change of the controlled variable to reduce to zero at the said predetermined rate.

* * * * *